United States Patent [19]

Schlafly

[11] Patent Number: 4,734,858

[45] Date of Patent: Mar. 29, 1988

[54] DATA TERMINAL AND SYSTEM FOR PLACING ORDERS

[75] Inventor: Hubert J. Schlafly, Greenwich, Conn.

[73] Assignee: Portel Services Network, Inc., Greenwich, Conn.

[21] Appl. No.: 674,696

[22] Filed: Nov. 26, 1984

Related U.S. Application Data

[63] Continuation-in-part of Ser. No. 558,303, Dec. 5, 1983, abandoned.

[51] Int. Cl.⁴ .................. G06F 15/22; G06F 15/20
[52] U.S. Cl. ............................ 364/408; 364/900; 235/380
[58] Field of Search ... 364/401, 406, 408, 200 MS File, 364/900 MS File; 235/379, 380

[56] References Cited

U.S. PATENT DOCUMENTS

| | | | |
|---|---|---|---|
| 3,719,927 | 3/1973 | Michels et al. | 364/406 X |
| 4,115,870 | 9/1978 | Lowell | 364/900 |
| 4,266,271 | 5/1981 | Chamoff et al. | 364/200 |
| 4,277,837 | 7/1981 | Stuckert | 364/408 X |
| 4,341,951 | 7/1982 | Benton | 235/379 |
| 4,361,851 | 11/1982 | Asip et al. | 358/84 |
| 4,415,065 | 11/1983 | Sandstedt | 364/401 X |
| 4,460,965 | 7/1948 | Trehn et al. | 364/401 X |
| 4,511,970 | 4/1985 | Okano et al. | 364/401 |

FOREIGN PATENT DOCUMENTS

2066540 7/1981 United Kingdom ............... 364/401

Primary Examiner—Jerry Smith
Assistant Examiner—Charles B. Meyer
Attorney, Agent, or Firm—St.Onge Steward Johnston & Reens

[57] ABSTRACT

A pocket size data terminal is described for use by a large number of consumers in a system with which goods or services can be conveniently and automatically ordered. A plurality of data terminals which can automatically dial a local processing center (LPC) are distributed among users each of whom can address the LPC with a unique user identification and an internal terminal identification. The terminal is internally battery powered. Each data terminal can accumulate orders for goods or services in a send memory while the terminal is unencumbered by any external connector. When subsequently connected to a phone line modular jack, upon command by a user send memory contents are automatically sent to an LPC in a short burst. The LPC verifies the use of the terminal, the authorization of the requested service and format of the data as well as other items as may be included in the order. Upon verification, the LPC returns an appropriate message for visual display at the terminal and processes the order to suppliers of the requested goods or services.

14 Claims, 17 Drawing Figures

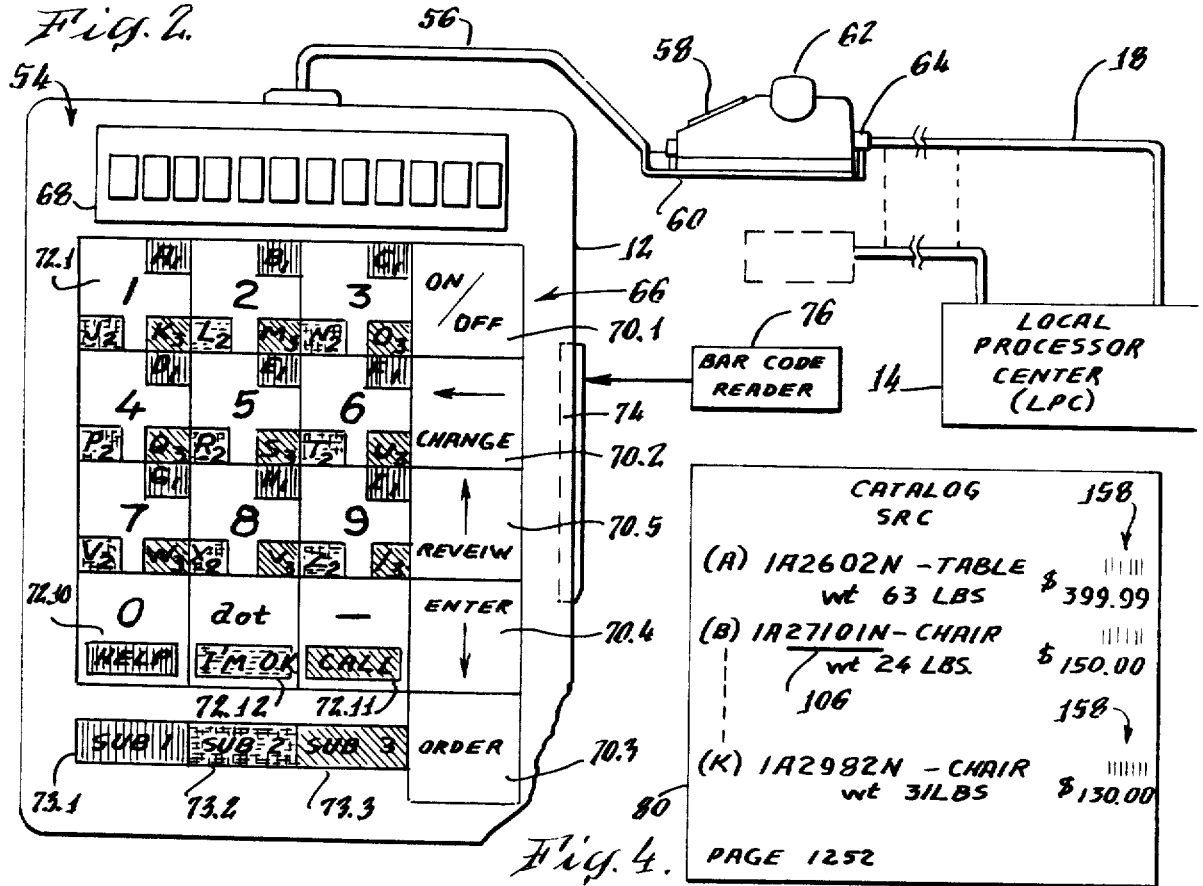
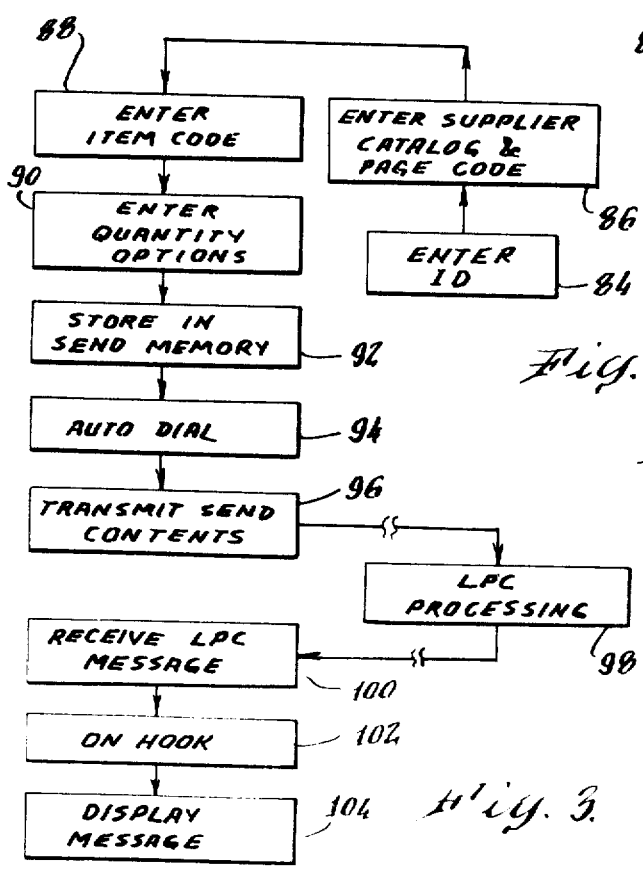
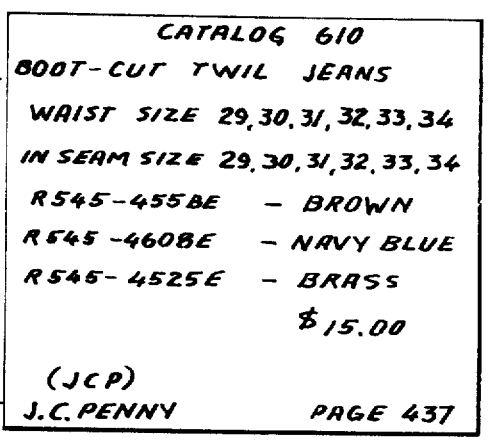
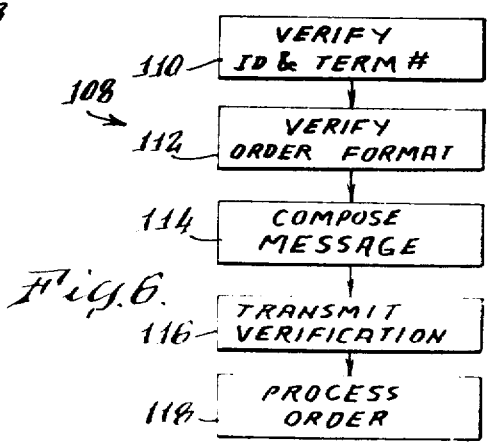

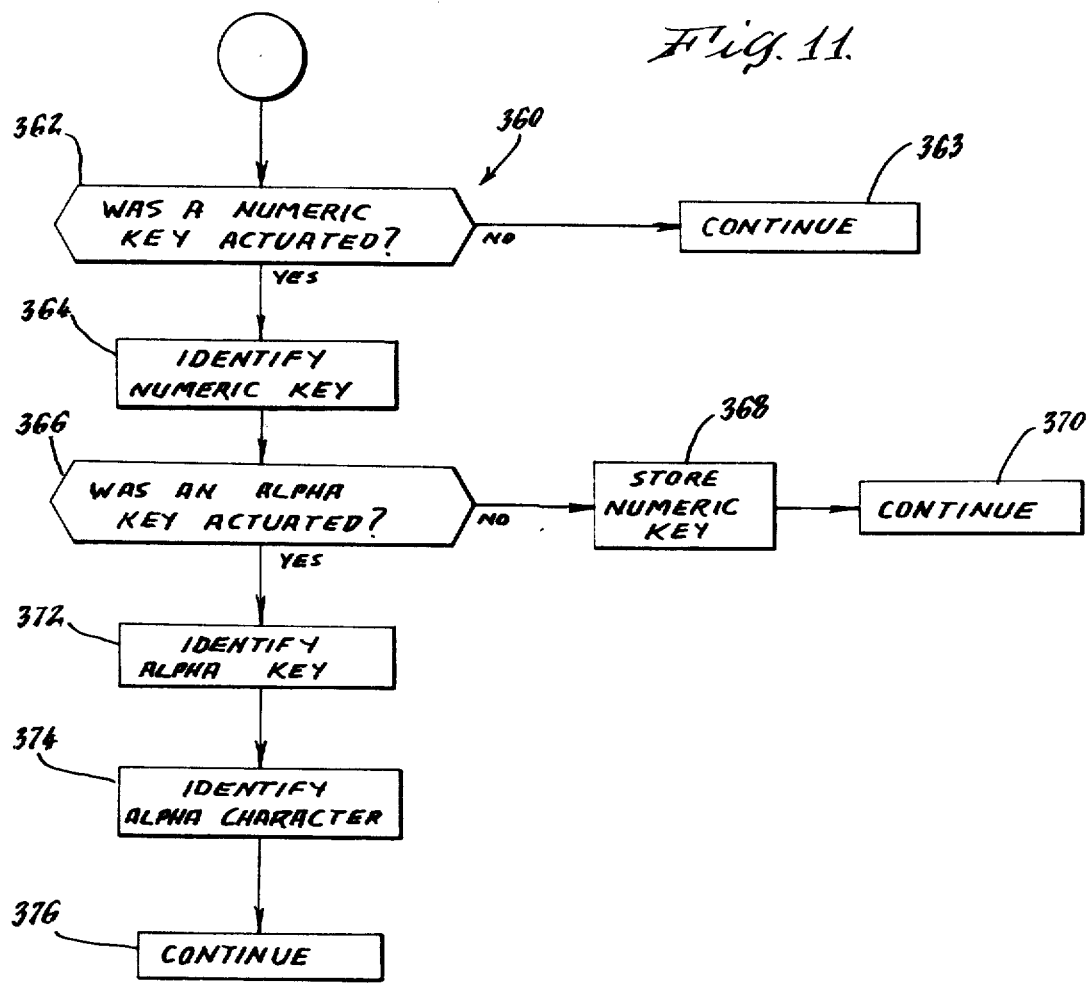

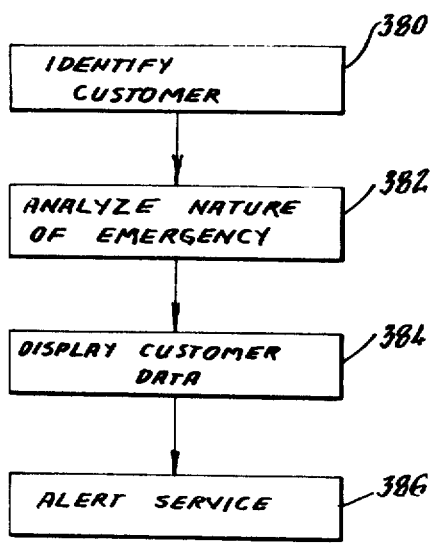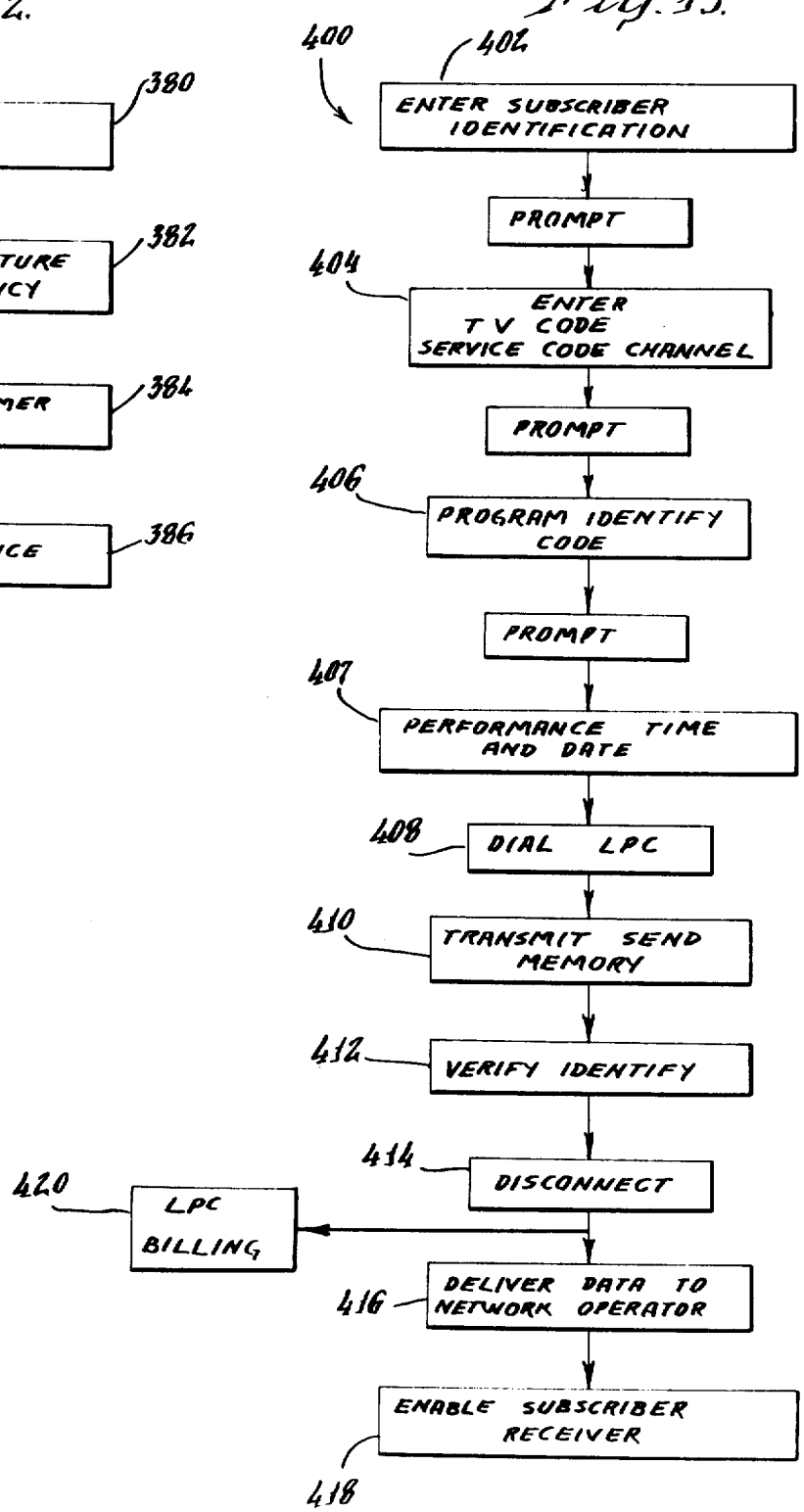

DATA TERMINAL AND SYSTEM FOR PLACING ORDERS

This application is a continuation-in-part of U.S. patent application Ser. No. 558,303, filed Dec. 5, 1983 and now abandoned.

FIELD OF THE INVENTION

This invention relates to a method and system for enabling a large number of consumers to place orders for goods or services with a data terminal. More specifically, this invention relates to a data terminal and data processing means with which goods or services can be ordered.

BACKGROUND OF THE INVENTION

Data terminals for communication with computers are well known. For example, U.S. Pat. No. 4,115,870 to Lowell teaches a small light weight hand-held battery powered data terminal with which a salesman enters orders for products including information such as the product code, quantity, nature of payment and the like. A customer identification number is entered and order information that has been entered may be recalled. Data entered is transmitted to a central terminal by way of a telephone connection. A display is employed to visually indicate the information being ordered.

Other data terminals of various types are shown and described in U.S. Pat. Nos. 4,277,837 to Stuckert; 3,976,840 to Cleveland, 4,090,247 to Martin, 4,032,931 to Haker and 3,792,444 to Spinner.

SUMMARY-OF-THE INVENTION

With a data terminal and system in accordance with the invention, a versatile technique is provided by which consumers, whose locations may be anywhere in the country where there is a telephone service, may order goods or services of a wide variety and from a broad range of suppliers. The suppliers may be local merchants or nationally represented. The system contemplates a network of local processing centers with which subscribers communicate to place orders. The users of the system are provided with convenient handholdable battery powered terminals with a limited number of order and function keys. This terminal is used by the consumer to initially select and store data representative of the orders. When later connected to a phone line the terminal can be commanded to automatically dial and transmit the stored data in a short burst over a telephone link to a local processing center for processing including customer verification, data format and credit verification, order placement and supplier contact. Each terminal is assigned an internal identification number and a specific local processing center which the terminal can automatically access.

The system further contemplates that the orders may be routed by the local processing center to local merchants or to a regional processing center for accumulation of orders, sorting and forwarding to a common nationally represented supplier. A number of local processing centers may be connected to a regional processing center and a number of regional processing centers may be interconnected with a national processing center.

The consumer data terminal used in the invention employs a keyboard, display, memory registers and processor control as are generally well known but are specifically adapted to provide unique language prompts, data storage and data communication in a convenient manner. In response to visually displayed prompts, the user selects, for example, the nature of the goods or services desired. The user chooses the supplier and the particular item, using a product code that is selected either from the supplier's catalog or from special instructions made available for that purpose. The particular data related to the selected item, together with an individual personal authorization code are entered in the terminal keyboard. The consumer may then review each stored segment of data to confirm or make changes or completely abort the data entry. All of the data related to the user's order, if it is to be executed, is stored in a send memory by a key command. Additional entries of orders can be made and placed in the send memory until it is filled.

When the consumer is ready, the orders placed in the terminal are transmitted after automatic dialing by the terminal through an internal data modem to a local processing center over a telephone communication link. The link normally involves a local call that can be promptly answered. If the call is for some reason not completed, the terminal automatically hangs up, waits for a predetermined period and dials again. The user does not have to be present during these automatic actions. Because the data to be sent is limited in length, the time needed to transfer data from a data terminal and obtain return verification from the local processing center is extremely short, of the order of a few seconds. As a result, a local processing center can service a large number of consumer data terminals with each phone line accommodating as many as one thousand of transactions per hour, without presenting an undue delay to any one terminal seeking access. One particularly advantageous feature of the invention contemplates a bar code reader, such as a light reading pen as one of several peripheral attachments through the terminal I/O connector with which data identifying any one particular product can be automatically read and entered into the send memory. Other peripheral equipment including a hard copy printer, security or utility sensor and monitoring systems, and wireless telephone transmission instruments may be connected through the I/O connector to the data terminal.

Another aspect of the invention includes use of a routine by which the user of the data terminal receives an immediate visual confirmation or error response from the local processing center. The latter is programmed to respond with a visual word display at the terminal after a check of the terminal and user identification numbers and proper order data formats and credit authorization. No voice exchange or written transfers are needed.

With a data terminal in accordance with the invention, product codes and stock numbers as presently employed in a wide variety of existing catalogs can be used in the ordering of merchandise. For example, as described herein for one embodiment, merchandise can be ordered with a data terminal from a supplier catalog using a particular code for that supplier catalog, page number, product identification numbers together with quantity and product option codes in the order and manner as these appear on the catalog page. Since the file at the local processing center includes in its computer memory the name, address and other related transaction data for this individual consumer, only limited order data is required from the user terminal when an order is placed. yet sufficient data is employed so that the order can be fulfilled.

In another form, product identifying bar codes can be printed in a catalog alongside the displayed products. When a customer desires a product, a simple scanning motion with an activated bar code reader will cause the entry of data identifying the catalog, the product and such other data deemed desirable for processing of an order. The data is automatically stored in the send memory of the terminal and transmitted to a local processing center at such time when the user connects the terminal to a phone line. The code reader and other peripheral equipment such as a hardcopy printer, and automatic sensor monitoring system, etc. of conventional design, can be connected to the terminal I/O socket through a suitable interface to automatically actuate the terminal transmission.

A particular advantage of one data terminal in accordance with the invention is the use of a special keyboard in which a group of keys carry both single digit numerals in sequence and alphabet characters which are distributed in a preferred manner. The alphabet characters are so placed that a group of first letters of the alphabet are placed in corresponding sequence on each of the keys in the group. The subsequent letters of the alphabet are generally uniformly distributed in numerical and alphabetic sequence on the group of keys. In this manner many common usages of letter codes for designation of merchandise or services can be accommodated with a single key actuation with ambiguity.

In some instances double key alphanumeric signals to the data terminal. For this purpose the alphabet characters are provided with subscripts or alternately with an identifying color which are used to identify a second key whose actuation is needed to assure unique specification of a letter character. The data terminal is then provided with appropriate program steps to uniquely define each entered character.

A desirable feature of a system in accordance with the invention is its extension to various categories of goods and services. Thus, for example, the categories may include local retail goods and services, merchandise from catalogs and mail order, TV viewings, tickets to events, banking services and the like. These categories are identified with a particular key code in the order data. An emergency service can be ordered with a preconceived code and a health status verification service may be provided.

A data terminal with which these various services can be provided includes a data storage medium such as a magnetic memory or a series of registers, and in which a portion is set aside as a send memory. Order data to be transmitted is accumulated in the send memory. A display of alpha-numeric characters is used so as to display selected characters as well as completed word prompts. A keyboard having functional code keys as well as the described alpha-numeric order keys is used to generate signals representative of requested orders. Each terminal in the system is provided with a unique terminal number that is stored in the send memory for transmittal to a local processor center. The data terminal includes programs which cause the display of prompts which characterize subsequent order key actuations and associated key signals as, for example, an identification code associated with a particular user. After entry of such identification code and its storage in the send memory, additional prompts are displayed in sequence. Entry of data called for by the prompts is displayed in segments so that an item being ordered can be easily and completely specified. Each sequence of order data is placed in the send memory after the user is satisfied with the accuracy of the visual display thereof. Several order items can be accumulated in the send memory prior to transmission. Transmission of orders is manually initiated by actuation of a function key at any time after an order is stored in the send memory. Placement of the order is implemented over a telephone link established with an automatic dialing network in the terminal.

Once a communication link with the local processor center (LPC) is established, all of the data in the send memory is transmitted in a burst and stored in the local processor center. This includes a data processor with which data such as the terminal number, identification code and order data format from the terminal is verified. An evaluation response is then returned and displayed for the user by the terminal. As soon as the LPC response has been sent, the phone connection is terminated by going "on hook", thus limiting the phone connection time for the LPC as well as reducing the current drain on the battery used to power the terminal.

It is, therefore, an object of the invention to provide a method and system for enabling the placement of orders of goods or services from a large number of users. It is a further object of the invention to provide a data terminal for the placement of orders of a wide variety of goods or services, yet enable a convenient use of the terminal by consumers. It is still further an object of the invention to provide a network with which a large number of consumer users spaced over a large geographical area or from a small area can conveniently place orders for goods or services from many different suppliers of goods and services, whether these be local or at distant places.

These and other advantages and objects of the invention can be understood from the following description of an embodiment in accordance with the invention and as shown in the drawings.

BRIEF DESCRIPTION OF DRAWINGS

FIG. 2 is a block diagram of a data terminal of this invention and connection thereof to a local processor center;

FIG. 3 is a flow chart of programs employed in data terminals and a local processor in accordance with the invention;

FIGS. 4 and 5 are examples of catalog sheets from which a user of a data terminal can place an order;

FIG. 6 is a flow chart of a program employed in a local process control center;

FIG. 11 is a flow chart for a program employed to use several key actuations to uniquely specify the alphanumeric character intended by the user of the keyboard of the data terminal;

FIG. 12 is a flow chart for an emergency response mode of a local processing center;

FIG. 13 is a flow chart for the operation of the data terminal and a local processing center to order particular television services over a TV cable network;

DETAILED DESCRIPTION OF DRAWINGS

Figure 1:
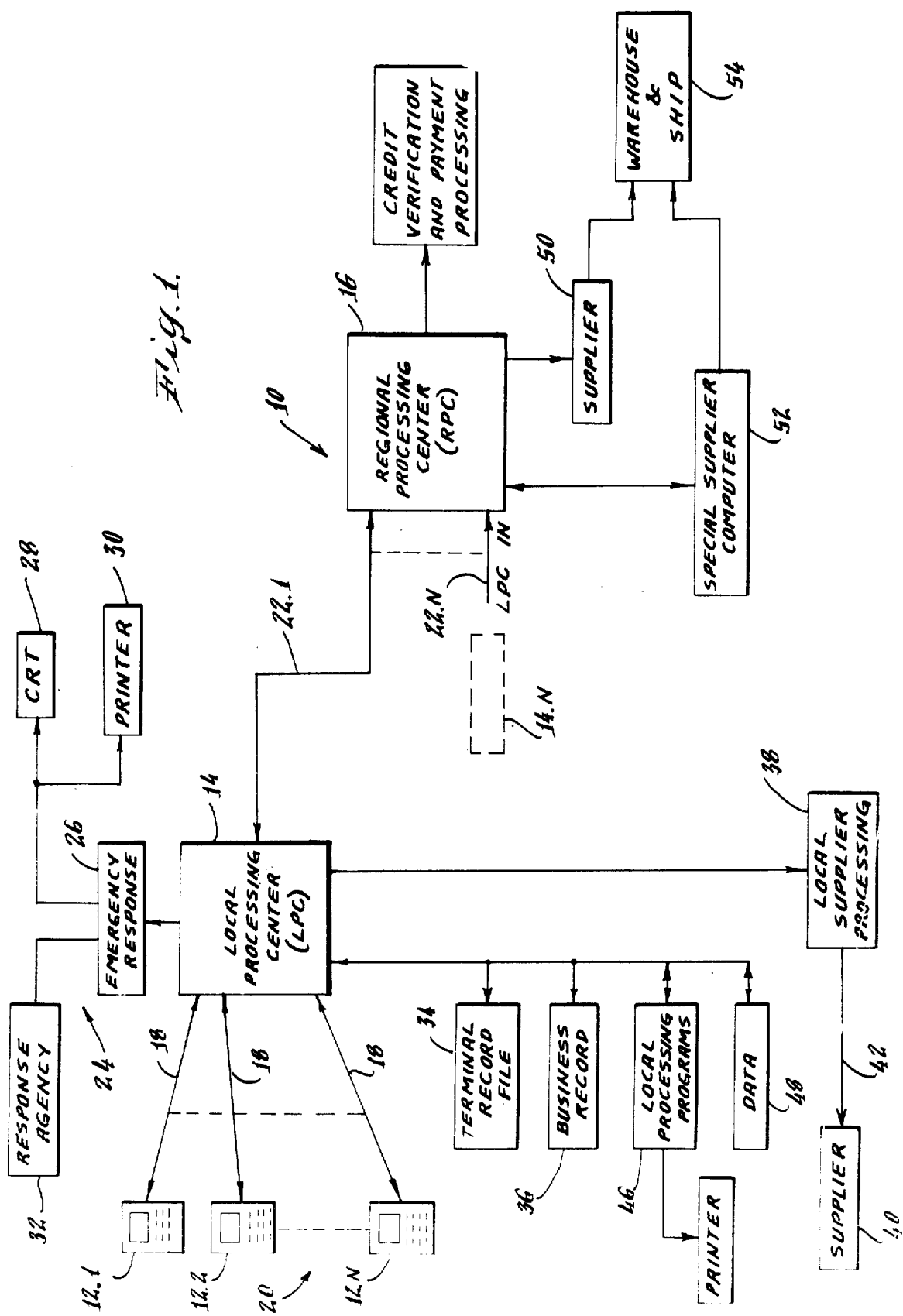
FIG. 1 is a block diagram of a network for placing and processing of orders from consumers.

With reference to FIG. 1, a network 10 is shown with which consumers having data terminals 12 can order various goods and services. The data terminals 12 are connectable to local processor centers (LPC) 14, each of which in turn may communicate with a regional processing center (RPC) 16. The communication links between terminals 12 and an LPC 14 are normally by conventional telephone lines 18 through local telephone switching centers (not shown). The links 18 are illustrated as separate lines, though in practice a very large number of data terminals 12 in a group 20 will be assigned the same telephone dialing number. These 18 lines may be connected by the telephone switching center to a single line or a series of automatic roll-over lines. When several subscribers would seek to access center 14 at the same time, either a busy signal would be encountered, or if several phone lines feed into the LPC 14, an automatic roll-over to the next open phone line would occur. If all LPC lines are unavailable, the terminal 12 will automatically disconnect, wait for a period of time and dial again until the connection is made.

The local processor center 14 includes a computer capable of receiving and responding to data on communication lines 18 as well as with regional processing center 16 over a communication link 22. This may have a higher data rate capacity and data format than the low data rate lines 18. The local center 14 may include an emergency response network 24 with which emergency calls from a data terminal are recognized and acted upon. The emergency network 24 includes a response program 26 capable of identifying the terminal 12 causing the emergency signal, a display 28 and printer 30 to indicate the nature of the emergency and the person, address and other relevant information obtained from files at the LPC. Provision is made for immediate forwarding of this information to an appropriate emergency response agency 32.

A local processor center 14 further is provided with appropriate computer accessible records 34 and 36 to store information related to each of the data terminals 12 in the group 20 and assigned to automatically dial the center 14. Thus, the names of the subscribers or users of the terminals 12, their addresses, credit authorization and the like are stored at 34 for rapid access by the computer in center 14.

In addition, orders intended for local sources or suppliers are handled with local supplier programs 38 and communicated to local suppliers 40 along communication lines 42. Business records may be stored at 36 and data from terminals 12 processed with programs 46. All input data is logged and stored at 48 to provide for error check and an audit trail if needed.

A regional processing center 16 is coupled to a number of local centers 14 along lines 22 and handles orders for common suppliers 50 by transmitting orders, either directly to the suppliers by way of a telex or the like, or into a computer 52 installed at the regional processing center 16 or at a supplier's facility. Orders are then fulfilled by the supplier by a shipment from a warehouse at 54. The order data supplied by a local center to the regional center 16 is generated by the local center from order data supplied by a data terminal 12 and data stored in the local center 14 on the user of the terminal 12.

Regional Processing Centers (RPC) also provide facilities for back-up files containing duplication data of portions of the Local Processing Center files, updated periodically. Thus, in case of an outage, data transmission from terminals 12 can be switched for alternate routing directly to the Regional Center for processing.

FIG. 2 illustrates the front panel 54 of a data terminal 12 which has its phone output line 56 connected to a telephone circuit 58 at its standard modular input jack 60 where the phone is normally connected or where a conventional "splitter" plug has been installed. Alternatively, the input/output line 56 may be directly connected to the phone line 18 at jack 64 which current telephone installations use. Connections to older telephone installations can also be made using readily available commercial hardware.

Front panel 54 includes a keyboard 66 and display 68. The keyboard has functional code keys 70 and alpha-numeric keys 72.1 through 72.10 with which order data is generated. The functional code keys 70 include an ON/OFF key 70.1, a CHANGE key 70.2 with which entered data can be altered, an ORDER key 70.3 to place entered data in a send memory, an ENTER key 70.4 to place data shown in the display in temporary memory and a REVIEW key 70.5 to cause a sequential display of data in memory. Key 72.11 is an auxiliary character and serves as a space key for the display. Key 72.12 operates as a decimal point, or in case of an emergency mode as an indication of the health or physical status of the user of terminal 14.

The alpha-numeric keys 72.1–72.10 function either as numeric or alphabet characters in a manner similar to a standard telephone keyboard. However, with the unique distribution of the alphabet designations as shown, many existing catalog product codes can be used with a single actuation of a key 72 without resulting in an ambiguity in specifying the ordered item. The alphabet characters are shown distributed in such a manner that the first ten letters, A through J, of the alphabet are on separate keys. Subsequent letters in the alphabet are distributed in sequence on and with that of the keys 72.

The alphabet designations on keyboard 66 are also provided with subscripts for those cases where multiple key actuations are desired to uniquely define each character. Each subscript specifies a second key to be actuated. This second key is preferably one of the special keys 73.1 through 73.3. Which one of these keys is activated is identified by the subscript letter associated with each letter of the alphabet as identified on the keyboard. In addition to or as an alternative to the subscript numbers, an appropriate color code might be used for the letters and the identifying keys 73.1 through 73.3. In such case two keys operated in sequence identify a specific letter of the alphabet.

Data terminal 12 is further provided with an input/output network and programming 74 with which the terminal can be connected to peripheral devices such as a handholdable bar code reader 76. Communication may be made through a suitable interface for reception of the signals generated by the bar code reader 76 or other peripheral. The bar code reader may be in the form of a light pen and is convenient to use in machine entry of the identification of particular merchandise items in a catalog.

Operation of a data terminal 12 in the case of ordering of merchandise from various mail order suppliers is illustrated with FIGS. 3-6. FIG. 4 shows a portion 80 of a page from a Sears catalog. FIG. 5 illustrates a portion 82 of a J.C. Penney Catalog page.

As an example of a catalog order data entry, at 84 in FIG. 3 and after turn on, the user's individual subscriber secret personal authorization number, a four digit number for example, promptly by a word display, is entered. This is followed by sequentially occuring prompts, which permit entry of additional order key actuations in accordance with suitable accompanying operating instructions.

The first set of prompts at 86 calls for the entry of a code specifying the supplier by its catalog and a page number. The second set of prompts at 88 requires specification of the nature of the transaction, e.g. catalog number and special charge and shipping instructions if required. The third set of prompts at 90 requires entry of the quantity and options such as color and size when these are needed to properly specify the desired item.

Once the item has been specified it can be reviewed and modified or it can be stored in a send memory at 92 and later caused to be sent at 94 by automatic dialing of the local processor center 14. Once communication has been established, the entire content of the send memory is transmitted in a burst by actuation of an internal modem (modulator/demodulator) 96 and the local center commences processing at 98. The send data is initially checked at 98 for verification of some of the data and a return is transmitted the data terminal at 100. The connection is then broken by the LPC and at 102 and the terminal goes "on hook". The message represented by the return is displayed at 104.

Thus if, for example, a user of a data terminal 12 desired to order furniture from the Sears catalog as shown in FIG. 4, the initial key entry at 86 in response to prompts would be something like C SRC 1252. Where "C" identifies catalog order processing, SRC identifies the supplier and catalog volume, and 1252 is the page number of the catalog on which the product is displayed. The key entry following prompts at 88 for a chair might be that portion of the product code shown on page 1252 needed to specify the item. Thus, for example, 7101 for the portion shown underlined at 106. In response to prompt C the only entry needed is the quantity. The response to this prompt could thus be 4. Note that the catalog can be identified by a number instead of an abbreviation.

Similarly, if merchandise from J. C. Penny, described in FIG. 5 is desired such as brown boot-cut twill jeans with a 32 waist and 34 inseam size, the response to the prompts would be, 1 610 437—for the prompts at 86; 4 558—for the prompts at 88; and 1 3234—for the prompts at 90.

The steps 84-92 need not be done while the terminal is connected to a phone line 18. An internal battery power source permits orders to be accumulated in a send memory and when the user is ready to place the order, the telephone connection of FIG. 2 is implemented. Since the terminal is light weight and pocket size, this feature permits great convenience and mobility of use.

Initial verification by a local processing center 14 of a data terminal transmission follows a routine as shown at 108 in FIG. 6. Thus, at 110 the LPC confirms that the user identification number entered at 84 in FIG. 3 and the terminal number associated with the terminal seeking to place an order are correct or correspond and that suitable credit arrangements have been identified. At 112 the data defining the item being ordered is confirmed as to availability of the service requested and as to the data format and at 114 an appropriate message is composed to be returned to the data terminal at 116. The LPC computer then processes the order at 118 if the initial verifications were properly made.

The processing step 118 depends upon the nature of the goods or services being requested. If this is an order for merchandise, the local processor center first appends additional information available in its storage medium. Thus the user identification number is used to retrieve information such as the full name of the user, the address, and credit information. The terminal number may be used to verify authorization of the service being requested as well as confirm for security reasons that the user identification number conforms with the terminal number.

Figure 8:
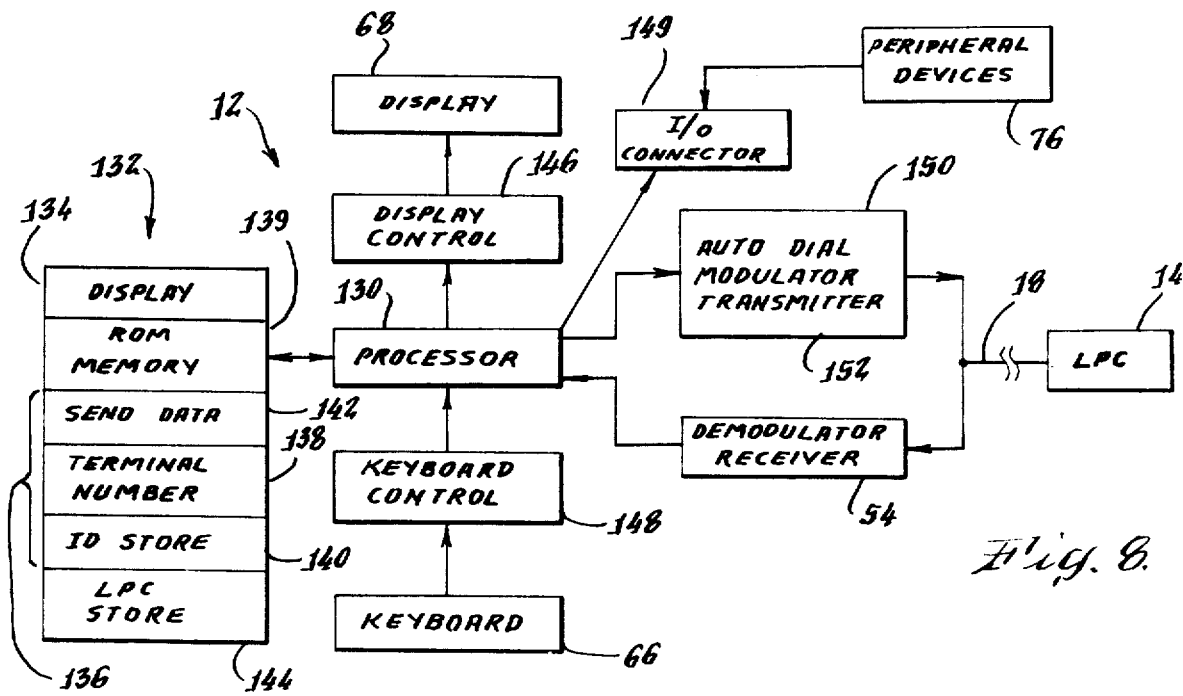
FIG. 8 is a general block diagram of components used to implement a data terminal in accordance with the invention.

The operation of a data terminal 12 is obtained as shown in FIG. 8 with known devices. A microprocessor 130 is connected to a data storage medium 132 which may be magnetic or such other known data storage device. The storage medium 132 includes specific segments that are allocated for such purposes as the storage at 134 of data that is displayed and entered but not yet authorized to be placed in a send memory 136. The send memory 136 is sized to accommodate a predetermined amount of data such as a terminal number at 138, a user identification number at 140 to be keyed in by the user at time of use and order data for a preset number of orders at 142. Returns from a local processor center are stored at 144. A read only memory at 139 for storage of the operating program and certain fixed values such as the terminal number and the prompts display sequence is also used. The entire data terminal preferably is battery powered for portability and ease of handling. The terminal 12 is made sufficiently small to be held in one hand and even fit inside a coat pocket or pocketbook.

The processor 130 controls display 68 with a display control 146 and communicates with keyboard 66 through a keyboard control 148. The devices and programs for the operation between processor 130 and the memory 132, keyboard 66 and display 68 are well known and need not be further described. Processor 130 also operates through an input/output unit 149 an automatic phone dialer 150 with which a communication phone link with a local processor center 14 can be established. The processor controls a transmitter 152 to send data and a receiver 154 to decode data returned on an established phone link 18. Automatic dialing, data transmitting and receiving with a remote signal processor are well known and need not be further described. Peripheral devices 76, such as a hardcopy print, security monitoring device or a light pen which may be used to scan appropriate bar codes 158 (see FIG. 5) that may be printed adjacent products shown in the catalog 82.

Figure 7:
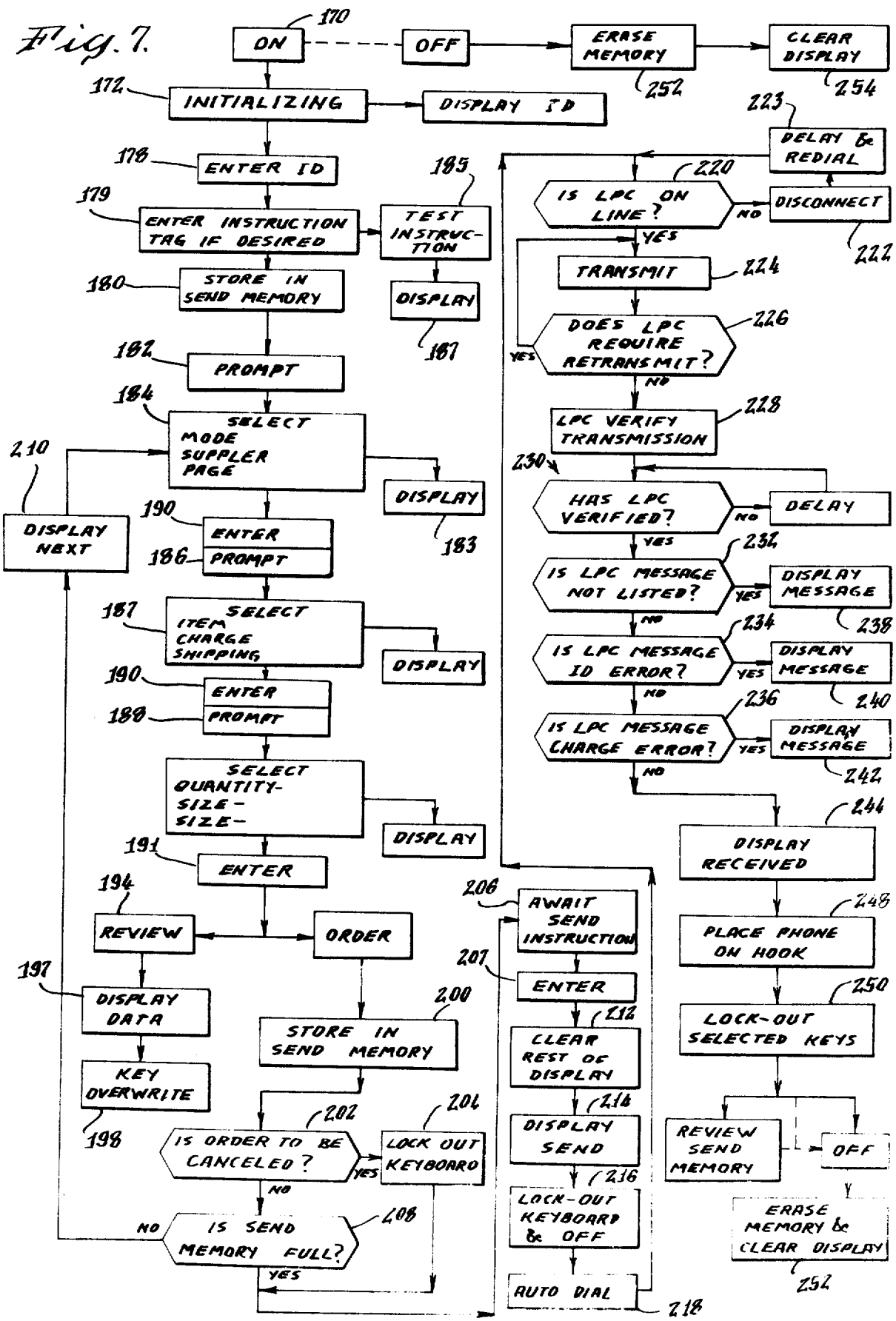
FIG. 7 is a more detailed flow chart of a program employed in a data terminal in accordance with the invention.

The program steps used to operate the data terminal 12 in accordance with the invention are shown in greater detail in Fig. 7. Thus, at 170 the terminal 12 is turned on. An initializing step 172 sets appropriate registers and memories and displays the prompt "ID" on the liquid crystal display 68. This action represent an opportunity for the user to key in characters from the keyboard 66.

The user identification code is entered through the keyboard at 178 and the number is displayed only as zero for each key stroke (as a security precaution). Four key strokes are required for an identification number to be valid. The ID number is then stored at 180 in the send memory 136 by actuating the ENTER key 70.4. An additional character entry can be made for special instruction at 179. For example, the data can be tagged as a "practice" exercise which causes the LPC to respond but not to forward any of this data to a supplier.

A next prompt (or series of prompts) is displayed at 182. The prompt may take a variety of different forms and in this embidiment is simply the letter A plus a series of eight dashes and requires entry at 184 of the information as described with reference to step 86 in FIG. 3. The dashes represent opportunities for the user to key in data. A dash remaining in the data format is a positive indication that the user intentionally used the "dash" key 72.11 or did not make a key entry for that character space. In an alternate version, individual word prompts are presented sequentially for each data key entry required. The actuated keys for the data line are displayed at 183. Similar data entries are made and displayed in response to prompts ar 186 and at 188 and subsequent enties at 190s and 191. After each data entered in response to the prompts actuation of the ENTER key initially stores the data temporatily in the display memory for subsequent review and change if so desired. Any displayed character can be changed by operating the CHANGE key 70.2. This key moves key control one character to the left in the display and allows a new character to be substituted in its place. A test at 185 indicates whether the instruction DATA 179 called for an order or a cancellation or a "call back" from the LPC business office. If the data entry specifies a cancellation, the prompt word CANCEL appears at 187 in the display and signifies that the following data indentifies a previously placed order which the user wishes to cancel.

After the last data entry is displayed, the user has the option of review and possible change of each entry in the display memory or transferring the data to the send memory. Such review is implememted by an actuation of the REVIEW key 70.5 at 194 which is decoded as a review request. This causes a sequential display of the data entered after each prompt at 196 and if so desired, a rewriting of the data by actuation of one or more keys 72 at 1983. A storage of the order data in the send memory 136 (see FIG. 8) can be implemented at any time at 200 by actuation of the ORDER key 70.3. A test is made at 202 whether this ORDER is to be cancelled. If so, the keyboard is locked out at 240 and the terminal 12 is caused to await a send instruction at 206 as entered at 207. Only one cancellation instruction can be sent at a time.

In the event the order was not a cancellation, a check is made at 208 whether the send memory 136 is full and if not, whether a new order transaction is to be entered by displaying the term NEXT at 210 and a new order can be entered commencing at 184. IKf the order is to be sent immediately after ORDER key 70.3 is operated, a send instruction can be implemented by the ENTER key 76.4. The display 68 is cleared at 212, except for CANCEL while SEND is displayed at 214. The keyboard is then locked out at 216 as well as the effect of the OFF key and automatic dialing of the local processor center is implemented at 218.

The data terminal then enters into a check mode at 220 to confirm a telephone connection with the LPC and if none has been established within a few seconds, the temrinal disconnects from the phone line at 222 and after a delay an automatic redialing is begun at 223. Once a telephone connection is made and confirmed by the return tone from the LPC, the send memory contents are transmitted at 224 in one burst. The transmission rate may be at the standard bit rate of 300 BPS or at some other convenient rate.

The local center enters into a check mode at 226 to review data from the terminal and determine, such as with a parity check, whether a retransmission is required. If not, the data is further verified at 228 by "look up" of information in the the LPC computer files as described with reference to FIG. 6, and returns a response data code.

During the time the LPC verifies data, the data terminal awaits at 230 a return code from the local center 14. Once the return has been received, the data terminal checks at 232, 234 and 236 as to what type of return message was received. Thus at 232 the fact that the requested order service or terminal is not authorized is recognized as an "NOT LISTED" message and then so displayed at 238. An error in the identification number is recognized at 234 aNd the error is displayed at 240. An error in the charge request is displayed at 242. If none of these errors are displayed at 238. An error in the identification number is recognized at 234 and the error is displayed at 240. An error in the charge request is displayed at 242. If none of these errors are returned a message which causes the data terminal to display "RECEIVED" at 244 is transmitted. The LPC terminates this call and is now available for the next terminal order on that same phone line. The data terminal goes ON HOOK at 248 followed by a lock-out at 250 of all keys except the REVIEW and OFF keys. These latter keys may then be actuated to enable a user to confirm what has been ordered or turn the the terminal off. The OFF key causes the send memory to be erased at 252 and the display to be completely cleared at 254. If the OFF key is not operated, the terminal continues to display the LPC return message for information to the users at a convenient time.

Figure 10:
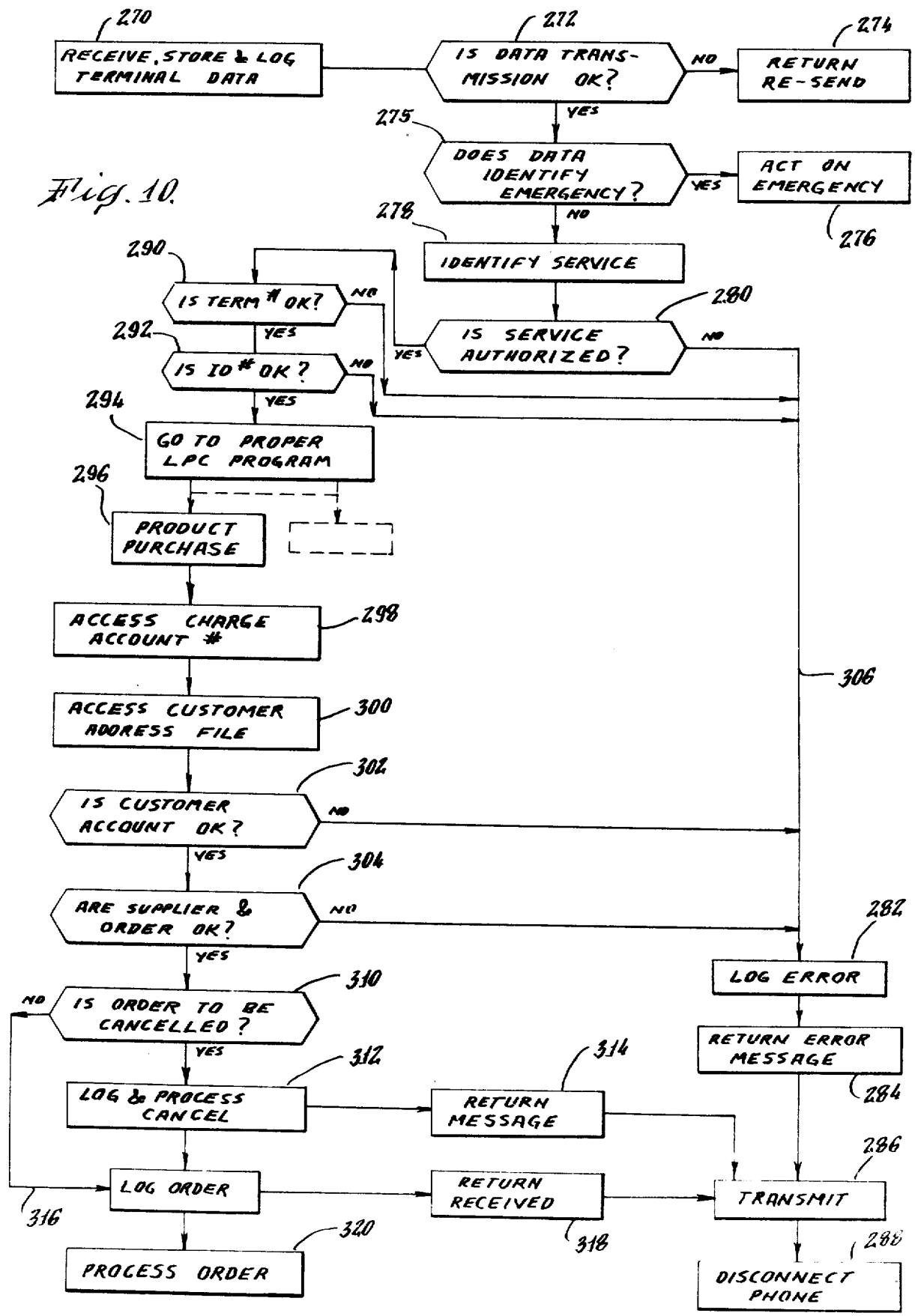
FIG. 10 is a flow chart for a program employed in a local processor center for use with a data terminal.

The local processor center 14 is provided with appropriate propgrams to communicate with the data terminals 12 to which the LPC may be connected while processing the various service orders placed by the terminals. Thus as shown in greater detail in Fig. 10 than FIG. 6, the LPC receives and stores and logs data from a terminal at 270. The data is tested for proper transmission at 272. If not, a resend request is returned at 274.

Once test 272 is passed, a check is made at 275 whether the data terminal is requesting an emergency service. If so, immediate action on the emergency is implemented at 276.

A test is then made at 278 as to what type of service is being requested by examining the most significant character in the data following the first prompt. At this step a test is made whether the characther following the "instruction" prompt signifies a practice run. If so, a log to this effect is made and further processing of data to a supplier by the LPC is prevented by setting of a flag. A test is made at 280 whether the requested service is authorized. Such test is made by comparing the request service code with a stored authorized service code for that terminal and user. If not an error is logged at 282 and a return message is prepared at 284 for transmittal to the data terminal at 286. Following this transmission, the phone connection is promptly broken at 288.

If the requested service is authorized, the data terminal number is verified at 290 and at 292 the user's identification number is verified, for example, by comparing it with the data terminal number sent by the data terminal and with similar information already stored in a secure file in the LPC. If the merchandise ordering service was requested the program is at 294 directed to the appropriate routine at 296. At 298 and 300 the user's charge account is accessed through a table look up of the user's identification number. If the customer's account is o.k. as checked at 302, the supplier and product or service references are reviewed at 304 to determine if the LPC recognizes these data as data entries serviced by that LPC.

When any of the tests coupled to line 306 fail, an error in the terminal data is recorded at 282 and an appropriate corresponding error message generated at 284. The error message is transmitted at 286 to the data terminal and after transmittal, the LPC automatically goes off the line or "on-hook" at 288.

In the event the order is to be cancelled as tested at 310 for the presence of a "cancel" code following the instruction prompt, this is recorded and the cancellation process implemented at 312. An appropriate cancel message is then returned at 314 to the data terminal.

When a proper order has been found to be present as finally determined at 316, the order is recorded and RECEIVED message returned at 318 to the data terminal 12. Transmittal of the message is followed by the phone disconnection at 288. The order is then processed at 320 by electrically sending appropriate information of the user, the nature of the credit and the data describing the ordered item to the supplier either through a regional processor center or directly into a computer at the supplier. Additional processing services such as hard copy print-out of an order form which the supplier can use as an invoice or shipping instruction can be prepared at the LPC or a regional processing center. This, however, requires additional computer files and programming services.

Figure 9:
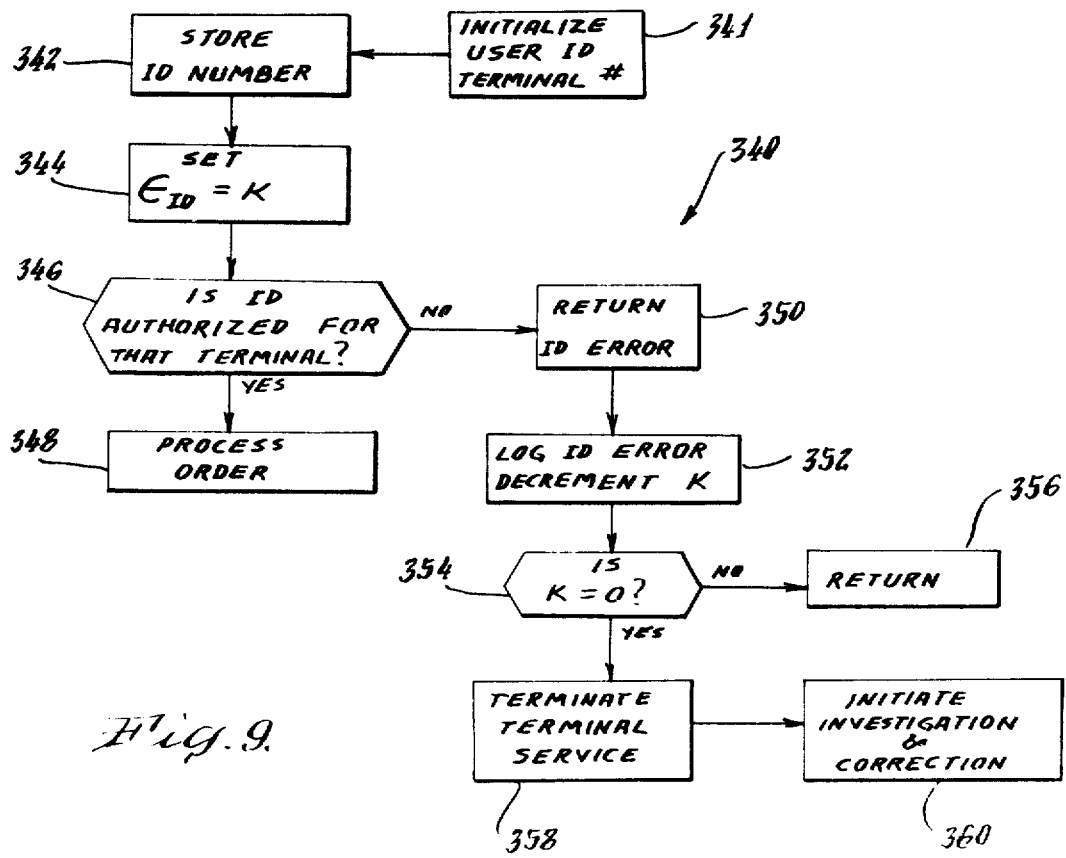
FIG. 9 is a flow chart for program steps used to render a data terminal secure against unauthorized use.

With the presence of a large number of data terminals 12, security against unauthorized use may be needed. Such security can be placed both within the terminal 12 itself and within a local processing center 14. FIG. 9 illustrates a technique 340 with which a data terminal 12 can be secured against an unauthorized attempt to place merchandise orders. Technique 340 can be inserted into the data terminal program as illustrated in FIG. 7 as part of step 178.

Thus with reference to FIG. 9, after initializing at the LPC including the entry of an assigned user data terminal number and user identification data and after entry and transmission of an individual user's identification code and its reception at 342, an error counter is set at 344 to a particular value K to record the number of times that an ID error has been received from a particular terminal. A test is made at 346 whether the received ID corresponds to an identification code stored in a protected file at the LPC. If the comparison checks out correctly, the program continues at 348 and assumes the user is authorized. If the comparison result is negative, the LPC returns a message to the terminal at 350 causing the display ID ERROR. The occurrence of such error is logged and K is decremented at 352. At 354 a test is made whether a predetermined number such as six, of attempts to use that terminal with the wrong identification number have occurred. If not, then the LPC program returns to other operations at 356. However, if K ates been decremented to zero, then at 358 the LPC locks out that terminal and refuses to accept any further transactions. A direct personal investigation and correction is then initiated as to that terminal at 360.

An additional security protection can be provided by design of the data terminal to transmit non-standard data formats, codes, bit rates or transmission tones. Such non-standard specifications would preferably apply only to the transmission from the home to the LPC or to a local area translator or descrambler box. Thereafter, transmission to the local or regional centers would preferably employ standard data formats.

It is noted that 26 alphabet letters cannot be uniquely identified for display, transmission or logging if only 10 keys are available for numeric entry. Examination of keys 72.1-72.10 of FIG. 2 shows that more than one letter is associated with each numeric key. Two key actuations for designating a specific character can be implemented with a technique 360 as shown in Fig. 11. Each letter on a single key is identified by a subscript number and/or distinctive color, with another key such as 73.1-73.3, identified as the alpha keys. The technique requires that an alpha key be actuated before a numeric key if an alpha character is to be identified. At 362 a test is made if numeric 72 key has been actuated. If not, the program continues at 363. If so, the numeric key 72 is identified at 364, for example, by looking up its value in a memory table. An inquiry is then made at 366 whether, prior to the numeric key actuation as detected at 362, an alpha key was actuated. If not, the numeric key as identified at 364 is stored at 368 as the valid key identification and the program is continued at 370.

However, if the test at 366 yields a positive answer, then the alpha key 73 is identified at 372. By then using the combination of the identified first numeric key and second alpha key, an alphanumeric character is identified and stored at 374 and the program continued at 376. Note that the program continuations enable execution of other program functions until another keyboard actuation causes a return to the technique 360.

With a data terminal and local processing center of this invention, a broad variety of services can be provided. One of these services may be an emergency mode. This, for example, can be implemented by assigning a particular sequence of characters in the identification code, such as four zeroes to designate an emergency. The fourth character of this emergency code can be used to identify the nature of the emergency. The numeric key which displays the letter "F" designates "fire". Similarly, the key for the letter "M" designates "medical" and the key for letter "p" designates "police" assistance required. The LPC in such case detects the emergency and, as shown in FIG. 12, proceeds at step 380 to identify the customer from the data terminal number that was received with the emergency data stream. The nature of the emergency, if this can be derived from the transmission from the data terminal, is detected at 382. The LPC computer file then supplies name, location and other pertinent data related to that terminal, for display at 384. An emergency response is initiated at 386 such as by alerting the police, fire or medical service as appears appropriate.

In FIG. 13 a technique 400 is shown to employ a data terminal system such as 20 to order special television programs or teletext information over a cable television or broadcast network. Such system 20 is particularly useful for a network capable of only one-way communication from a control source to subscribers. The technique 400 commences at 402 with an entry of the user's identification number and following prompts with the entry at 404 of an appropriate code to identify the television service and channel. Following particular prompts, the specific program code at 406 and the performance time and date at 407 are entered.

The steps of dialing the LPC at 408, transmission at 410, verification at 412 and disconnect at 414 steps are as previously described. The LPC causes the program request to be delivered at 416 the network operator such as in the latter's computer. The operator then enables transmission of the selected program at 418. This program selection and operator response can be rapidly implemented without requring a two way cable communication capability. Billing of the requested service is implemented by the LPC at 420.

Figure 14:
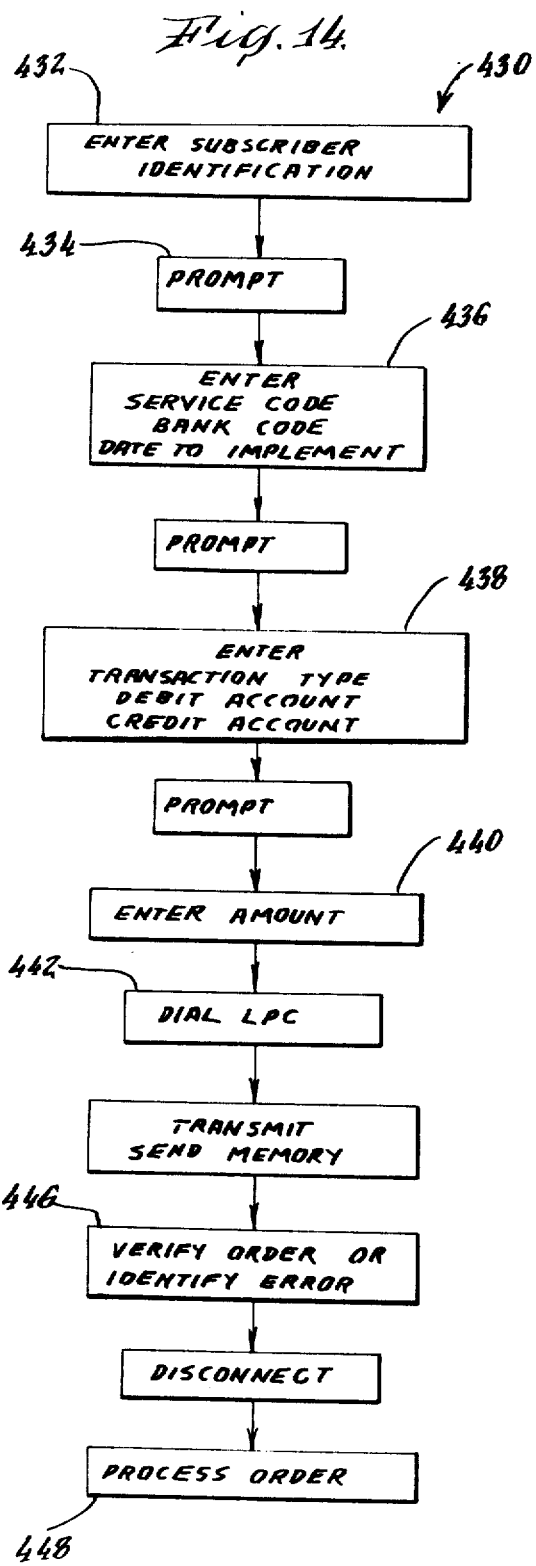
FIG. 14 is a flow chart for the operation of the data terminal and a local processing center for ordering banking services.

A banking type order can be placed with the terminal in the technique 430 as shown in FIG. 14. Steps 432 and 434 are as previously described for entering the user's identification number and the automatic display of a first prompt. The particular service and bank identification codes are then entered at 436 and following prompts call for the particular transaction, debit and credit account numbers, if these are needed, are entered at 438. The amount involved is entered at 440.

The entered data is then stored in the send memory followed by automatic dialing of the LPC at 44, transmission of data at 444, verification of data at 446 and processing of the order at 448 by storing and forwarding it to the bank involved.

Figure 15:
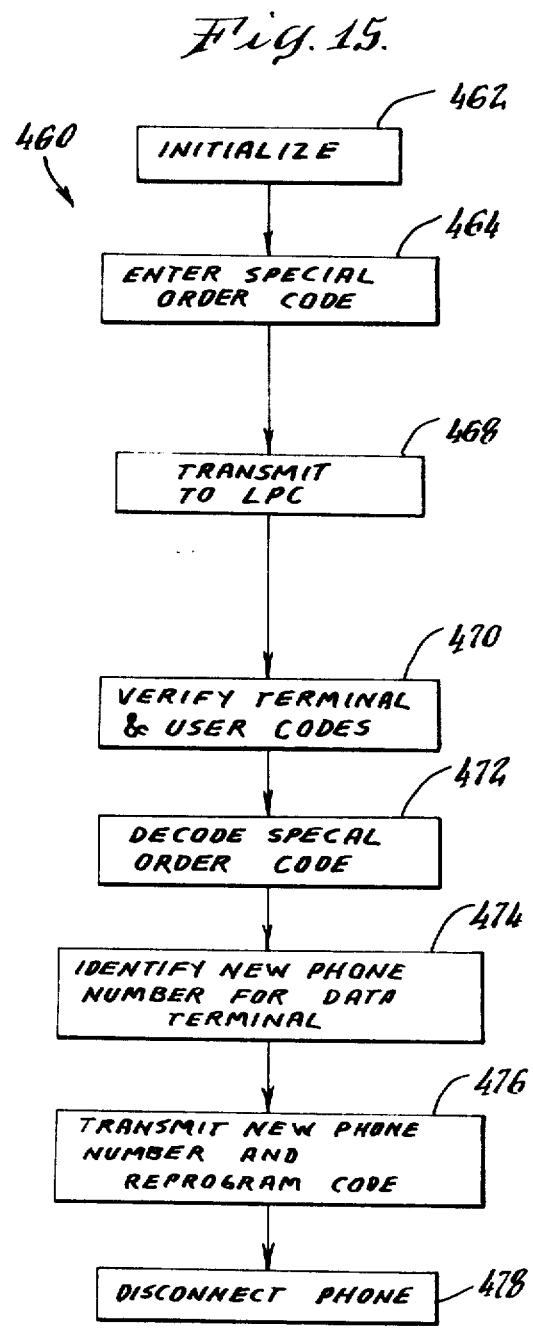
FIG. 15 is a flow chart for the operation of the data terminal with a local processing center for terminal modification to enable it to operate with a different local processing center.

FIG. 15 illustrates a technique 460 for altering the telephone number stored in a data terminal for dialing of the LPC. Such change may be needed, for example, when a user moves to or wishes to use a data terminal in an area where another LPC is used to process the transaction.

Technique 460 commences at 462 with initializing steps such as entry of the user's ID number and follows at 464 with the entry in response to a prompt for a special order code. Such code may be obtained from an operator at the LPC in response to a regular phone call request for reassignment to a new location where the user wishes to use his data terminal.

The user activates his terminal and enters the special code for transmission to the LPC at 468 followed by verification at 470. The special order code is decoded by the LPC at 472. The new phone number for use in the automatic dialer by the data terminal and which number corresponds with the new user location is identified at 474 by the LPC by reference to its memory files. The new phone number is then returned to the data terminal for storage in its memory at the location where the previous phone number was stored at 476. The phone link is disconnected at 478. Execution of this phone number replacement may be done with the inclusion of a special code that triggers such replacement.

Figure 16:
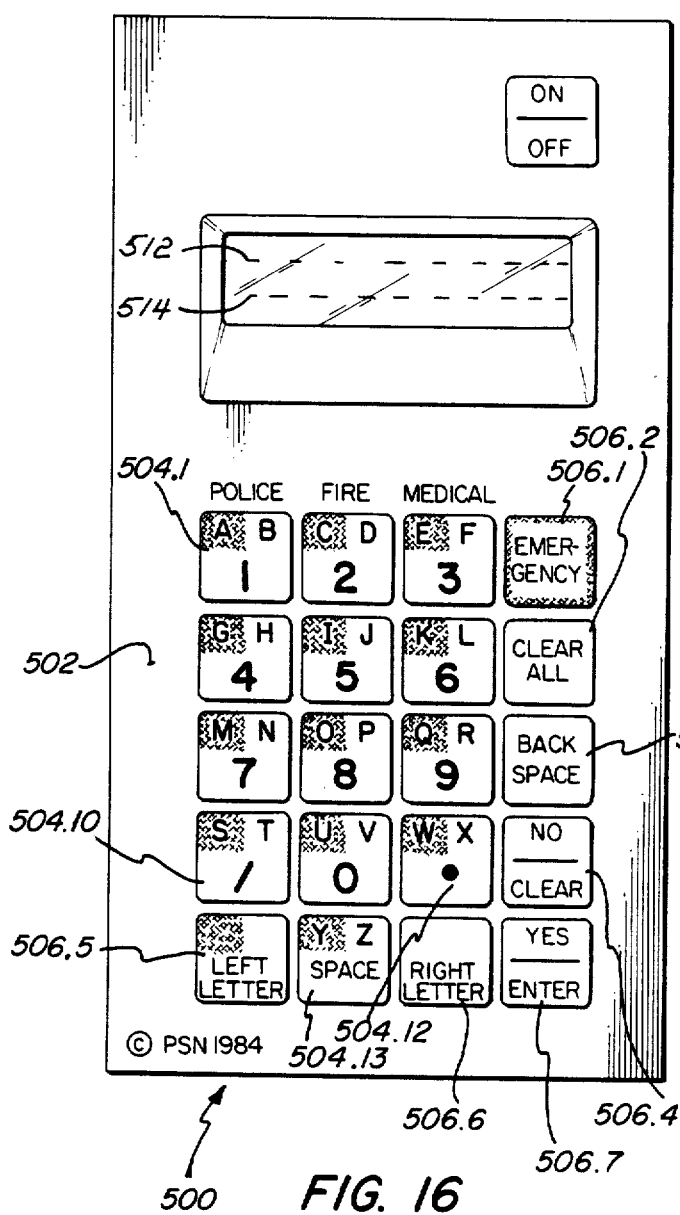
FIG. 16 is a plan view of another data terminal in accordance with the invention.

FIG. 16 illustrates an alternate data terminal 500 in accordance with the invention. In FIG. 16 terminal 500 has a keyboard 502 with an array of keys arranged in separate groups. A first group is formed of alphanumeric keys 504.1-13 and a second group is composed of control keys 506.1-7.

The alphanumeric keys 504.1-13 carry numeral designations 0-9 and pairs of alphabet letters 508 are arranged alongside each other in side by side relationship with the letters in each pair being differently color coded, such as with a different color background, orange on the left side and natural on the right side. The control keys 506.5 and 506.6 are activated with corresponding alphabet letters to identify a specific alphabet letter. The alpha control keys 506.5-6 are, therefore, correspondingly placed and colored as the alphabet letters with orange on the left and natural on the right.

A particularly desirable feature of data terminal 500 is an expanded prompt display 512 capability and response display 514. This enables a user friendly prompting for the use of the terminal 500. One particularly desirable aspect of the data terminal 500 is its use of a personal identification code, such as described with reference to FIG. 3.

Figure 17:
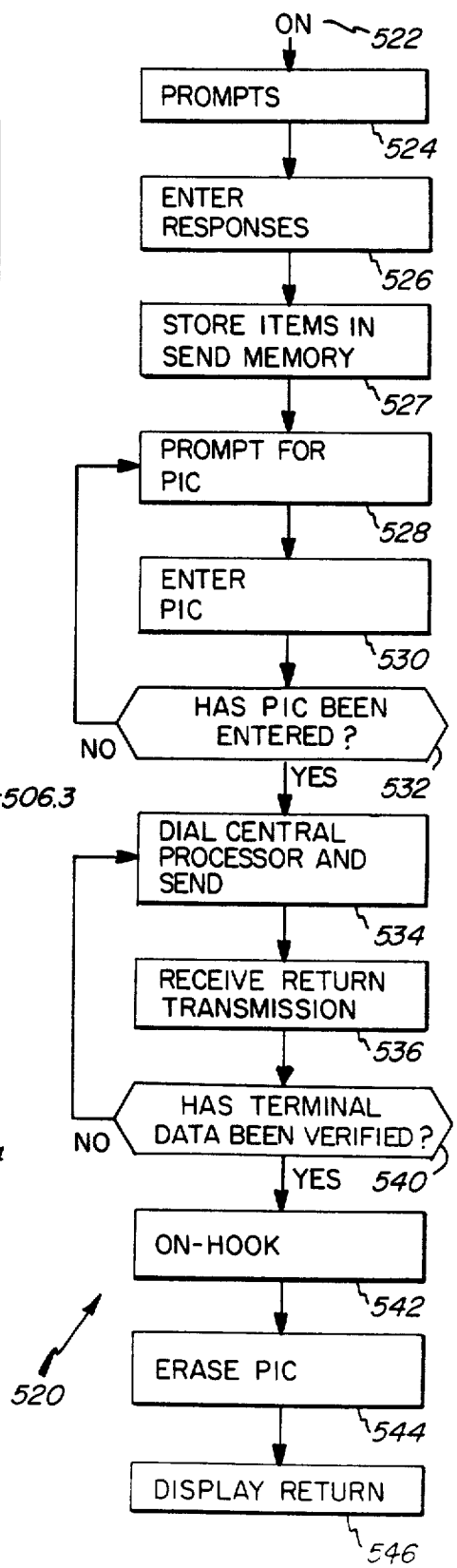
FIG. 17 is a flow chart for operation of a data terminal in accordance with the invention.

In the technique 520 as shown in FIG. 17 the personal identification code (PIC) is the last entered information and its entry triggers the transmittal of data from terminal such as 500 with the PIC. If the central processor accepts the terminal data and returns an appropriate response to this effect the PIC is automatically erased.

Thus, after turn-on at 522 the user responds at 524 to prompts at 526 with appropriate item selections and subsequent storage at 527. These items, if taken from catalogues will carry the entire catalogue designation code. Prompts are used to indicate and enter particular sizes and colors.

When data is to be sent the terminal 500 will initially request at 528 that a personal identification code be entered. Once this is done at 530 as confirmed at 532 the terminal 500 proceeds to dial the central processor and send data at 534.

The central processor verifies the terminal transmission and returns a signal to that effect to the data terminal at 536. The terminal 500 reviews return transmissions at 540. If the control processor has detected transmission errors it can by return code request the terminal to send again. However, if the return transmission from the central processor has been verified, such as can be determined from a decoding of a signal to that effect, the phone placed back "on-hook" at 542, the personal identification number is erased from the terminal at 544 and a display of the return is made at 546.

With the technique in accordance with FIG. 17 the personal identification code does not remain very long in the terminal, thus preventing unauthorized capture or detection of this code.

In the transmittal of data appropriate delimiters are used to separate characters, items and messages. The central processor may be able to send more messages than can be stored in the terminal send register by causing the display of an appropriate prompt to that effect followed by an appropriate send request by the user to continue the return message.

At the central processor each received transaction is appropriately logged as to time and date of receipt. Special security precautions are taken to safeguard the personal identification codes of users. Emergencies are responded to by the terminal without having to enter a personal identification code.

Having thus described a data terminal and system in accordance with the invention, its advantages can be appreciated. Variations from the described embodiments and additional service offerings can be implemented without department from the scope of the invention.

What is claimed is:

1. A system for ordering services of goods by generating digital data representative of particular orders to a local processor center over telephone lines comprising:
 a plurality of hand-carryable user data terminals assigned to individual users with respective uniquely associated user identification codes;
 each data terminal having:
 (A) a data storage medium including a send memory in which ordering data and identification data for transmission to the local processing center is stored;
 (B) a display of alpha-numeric characters;
 (C) a keyboard having functional code keys and order defining keys which carry both alpha and numerical characters, and means for generating key signals respectively identifying individually actuated keys and individual alpha and numeric characters thereon;
 (D) said send memory storing data representative of an identification of the data terminal;
 (E) means for causing on said display a display of a visually readable prompt which characterizes subsequent key actuations as representative of an identification code of the user of the terminal, and means for storing said user identification code in said send memory;
 (F) means for causing on said display a display of selected prompts, each of which characterizes subsequent order key actuations and associated key signals as representative of predetermined data of a particular order, and means for storing key signals representative of the latter key actuations in a location of the send memory designated for said particular order;
 (G) automatic dialing means for establishing a telephone communication link between the data terminal and the local processor center;
 (H) means for actuating said automatic dialing means and transmitting all of the data accumulated in the send memory to said local processing center over said link in a short burst; and means for receiving response data over said link from said local processing center and storing said response data in the data terminal storage medium;
 (I) means responsive to said response data from the local processor center for causing a corresponding display thereof on said display;
 said local processor center including:
 (A) means for verifying data representative of terminal number and the user identification as received from respective ones of said terminals;
 (B) means for identifying the order data being sent by a terminal;
 (C) means for transmitting an evaluation response to a said terminal with respect to order and identification data sent by the terminal; and
 means for terminating said telephone link a predetermined short time after said evaluation response transmittal to limit the duration of said communication link.

2. The system as claimed in claim (2) 1 wherein said data terminal further includes:
 means for identifying an order as one to be cancelled by the local processor center.

3. The system as claimed in claim 2 wherein said data terminal further includes:
 means for effectively locking out the keyboard when order data has been identified as to be cancelled.

4. The system as claimed in claim 2 wherein the data terminal further includes:
 means for effectively locking out the keyboard for the time when the communication link is established.

5. The system as claimed in claim 4 wherein the data terminal further includes:
 means for identifying an order as a practice order.

6. The system as claimed in claim 4 wherein the verifying means further includes:
 means for storing at the local processor center the data terminal identification in association with a known authorized user identification;
 means for comparing the user identification received from the data terminal with the user identification initially stored in the local processor center and authorized with the data terminal identification;
 means for limiting service by the local processor center to a data terminal after a predetermined number of attempts by said comparing means have failed.

7. The system as claimed in claim 1 wherein the local processor center further includes:
 means for identifying an emergency order from the order data sent by the data terminal and generating a signal indicative thereof.

8. The system as claimed in claim 1 wherein the local processor center further includes:
 means for identifying order data from a data terminal as signifying a request for a cable television program; and
 means responsive thereto for generating signals to enable the user of the data terminal to receive said cable television program.

9. The system as claimed in claim 1 wherein the local processor center further includes:
 means for identifying order data from a data terminal as signifying an address change;
 means for transmitting to said data terminal data representative of a phone number associated with the address change;
 and wherein the data terminal further includes means for replacing the phone number associated with the local processing center with the phone number associated with the address change.

10. A data terminal to enable a plurality of users to place requests with a central processor through telephone lines with a plurality of such data terminals located at user locations comprising:
 a user located handholdable data terminal having a keyboard, a display, a memory, input/output means for establishing data communication between the data terminal and the central processor through a telephone line, and processor control means for operation of the data terminal, said memory having a data terminal identification code which bears a known association with a user identification code;

means for entering and then storing the user identification code in said memory;

handholdable means for reading visually printed codes and producing items data indicative thereof and storing the item data in said memory;

automatic dialing means in said terminal for establishing a telephone link between the data terminal and the central processor; and means in said data terminal for transmitting said data terminal identification code, said user identification code and said item data to said central processor in a short time burst.

11. A method for operating a system for ordering goods or services requested by consumers comprising the steps of:

storing at a local processing center for each of a plurality of data terminals a data terminal code and a user identification code and a service authorization code;

receiving at said local processing center short bursts of data communications from a plurality of data terminals, with each data communication including said data terminals, said user identification code, and order data of predetermined maximum length;

verifying the received data terminal code and user code as received from each data terminal; and forwarding the order data to suppliers to enable fulfillments of the requests upon verification of the communication data with respect to properly matching of terminal and user codes and authorization of the requested service;

detecting from a data communication received from said data terminal that order data in said data communication needs to be cancelled; and forwarding such cancellation order to the associated supplier.

12. The method for operating the system as claimed in claim 11 and further comprising the steps of:

detecting from a data communication received from a data terminal that said communication represents an emergency;

retrieving at the local processor center from the received data terminal code an identification of the user; and forwarding the identification of the user and emergency detection for response.

13. The method for operating the system as claimed in claim 12 and further comprising the steps of:

inhibiting said step of forwarding to a supplier as to a particular terminal when the received user identification and terminal number transmitted by said latter terminal fail to be verified a predetermined number of times.

14. A data terminal to enable a plurality of users to place requests for items with a central processor by using telephone lines for coupling data terminals at the users to the central processor, comprising;

a handholdable data terminal having a keyboard, a display, a memory and processor control means coupled thereto for operation thereof, said keyboard being formed of an array of keys, a first group of keys in the array carrying predetermined functional code designations, and a second group of thirteen keys in the array carrying both numeral and alphabet characters; each key in said second group of keys carrying a pair of alphabet characters which are spatially placed in a horizontal side by side relationship alongside each other, and ten of said keys carrying different numerical characters, with a pair of alphabet control keys in the first group being spatially arranged on the keyboard to correspond with the placement of the alphabet characters on keys in the second group; means responsive to the activation of a key in the second group and an alphabet control key for generating a key signal to functionally associate the alphabet characters with an alphabet control key and unambiguously identify each alphanumerical character on an actuated key in the second group; said memory including a send memory and means for storing key signals in said send memory;

means for automatically dialing a phone number to establish a telephone link between the data terminal and the central processor;

means responsive to the entry of a personal identification code for initiating the dialing of a phone number and the transmittal of the send memory contacts and the personal identification code to the central processor; and means responsive to a transmission from the central processor for erasing the personal identification code from the data terminal.

* * * * *

REEXAMINATION CERTIFICATE (3129th)

United States Patent [19]

Schlafly

[11] B1 4,734,858

[45] Certificate Issued Feb. 11, 1997

[54] DATA TERMINAL AND SYSTEM FOR PLACING ORDERS

[75] Inventor: Hubert J. Schlafly, Greenwich, Conn.

[73] Assignee: Portel Services Network, Inc., Greenwich, Conn.

Reexamination Request:
No. 90/003,740, Feb. 23, 1995

Reexamination Certificate for:
Patent No.: 4,734,858
Issued: Mar. 29, 1988
Appl. No.: 674,696
Filed: Nov. 26, 1984

Related U.S. Application Data

[63] Continuation-in-part of Ser. No. 558,303, Dec. 5, 1983, abandoned.

[51] Int. Cl.[6] ............................ G06F 17/60; G06F 153/00
[52] U.S. Cl. ................. 364/408; 364/932.62; 364/948.2; 364/DIG. 2; 235/380; 348/10; 348/13; 379/91; 379/105
[58] Field of Search .................. 364/401, 408, 364/406; 235/379, 380; 379/90, 91, 93

[56] References Cited

U.S. PATENT DOCUMENTS

| | | | |
|---|---|---|---|
| 3,719,927 | 3/1973 | Michels et al. | 364/406 |
| 4,007,443 | 2/1977 | Bromberg et al. | 340/172.5 |
| 4,019,174 | 4/1977 | Vanderpool et al. | 340/172.5 |
| 4,114,027 | 9/1978 | Slater et al. | 235/419 |
| 4,115,870 | 8/1978 | Lowell | 364/900 |
| 4,266,271 | 5/1981 | Chamoff et al. | 364/200 |
| 4,267,646 | 5/1981 | Hagwell | 434/111 |
| 4,277,837 | 7/1981 | Stuckert | 364/408 |
| 4,341,951 | 7/1982 | Benton | 235/379 |
| 4,355,372 | 10/1982 | Johnson et al. | 364/DIG. 2 |
| 4,361,851 | 11/1982 | Asip et al. | 358/84 |
| 4,415,065 | 11/1983 | Sandstedt | 364/401 |
| 4,450,320 | 5/1984 | Ostermann et al. | 179/5 R |
| 4,460,965 | 7/1948 | Trehn et al. | 364/401 |
| 4,511,970 | 4/1985 | Okano et al. | 364/401 |
| 4,517,561 | 5/1985 | Burke et al. | 340/825.07 |

FOREIGN PATENT DOCUMENTS 2066540  7/1981  United Kingdom ............ 364/401

OTHER PUBLICATIONS

H. Schlafly et al., DOT Documents, Jul. 20, 1982.
Paul Kagan Associates, "Cable TV Technology", Jun. 4, 1982.

*Primary Examiner*—Robert A. Weinhardt

[57] ABSTRACT

A pocket size data terminal is described for use by a large number of consumers in a system with which goods or services can be conveniently and automatically ordered. A plurality of data terminals which can automatically dial a local processing center (LPC) are distributed among uers each of whom can address the LPC with a unique user identification and an internal terminal identification. The terminal is internally battery powered. Each data terminal can accumulate orders for goods or services in a send memory while the terminal is unencumbered by any external connector. When subsequently connected to a phone line modular jack, upon command by a user send memory contents are automatically sent to an LPC in a short burst. The LPC verifies the use of the terminal, the authorization of the requested service and format of the data as well as other items as may be included in the order. Upon verification, the LPC returns an appropriate message for visual display at the terminal and processes the order to suppliers of the requested goods or services.

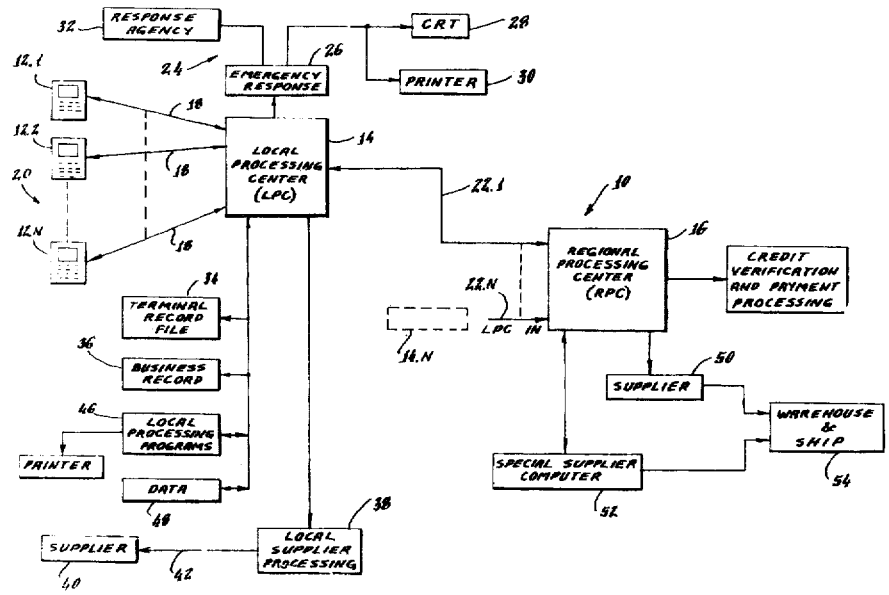

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 10–14 is confirmed.

Claim 1 is determined to be patentable as amended.

Claims 2–9, dependent on an amended claim, are determined to be patentable.

New claims 15–21 are added and determined to be patentable.

1. A system for ordering services [of] *or goods from a supplier* by generating digital data representative of particular orders to a local processor center over telephone lines comprising:

a plurality of hand-carryable user data terminals assigned to individual users with respective uniquely associated user identification codes:

each data terminal having:

A) a data storage medium including a send memory in which ordering data and identification data for transmission to the local processing center is stored;

B) a display of alpha-numeric characters;

C) a keyboard having functional code keys and order defining keys which carry both alpha and numerical characters, and means for generating key signals respectively identifying individually actuated keys and individual alpha and numeric characters thereon;

D) said send memory storing data representative of an identification of the data terminal;

E) means for causing on said display a display of a visually readable prompt which characterizes subsequent key actuations as representative of an identification code of the user of the terminal, and means for storing said user identification code in said send memory;

F) means for causing on said display a display of selected prompts, each of which characterizes subsequent order key actuations and associated key signals as representative of predetermined data of a particular order, and means for storing key signals representative of the latter key actuations in a location of the send memory designated for said particular order;

G) automatic dialing means for establishing a telephone communication link between the data terminal and the local processor center;

H) means for actuating said automatic dialing means and transmitting all of the data accumulated in the send memory to said local processing center over said link in a short burst; and means for receiving response data over said link from said local processing center and storing said response data in the data terminal storage medium;

I) means responsive to said response data from the local processor center for causing a corresponding display thereof on said display;

said local processor center including:

A) means for verifying data representative of terminal number and the user identification as received from respective ones of said terminals;

B) means for identifying the order data being sent by a terminal; *and for providing the order data to the supplier;*

C) means for transmitting an evaluation response to a said terminal with respect to order and identification data sent by the terminal; and means for terminating said telephone link a predetermined short time after said evaluation response transmittal to limit the duration of said communication link.

*15. A system for ordering goods or services to enable a plurality of users to communicate requests to a central processor through telephone lines with a plurality of data terminals located at user locations, the system comprising:*

*a plurality of handholdable user located data terminals, each terminal having:*

*(A) a keyboard;*

*(B) a display;*

*(C) means for causing on said display a display of selected prompts, each of which characterizes subsequent order key actuations and associated key signals as representative of predetermined data of at least one particular order;*

*(D) a data storage memory for storing said key signals representative of key actuations in a memory location designated for said at least one particular order, said memory having a data terminal identification code which bears a known association with a user identification code;*

*(E) input/output means for establishing data communication between the data terminal and the central processor through a telephone line;*

*(F) processor control means for operation of the data terminal;*

*(G) means for entering and then storing the user identification code in said data storage memory;*

*(H) handholdable means operatively associated with said terminal for reading visually printed codes and producing items data indicative thereof comprising items of said at least one particular order, and storing the items data in said data storage memory;*

*(I) automatic dialing means in said terminal for establishing a telephone link between the data terminal and the central processor; and*

*(J) means in said terminal for transmitting said data terminal identification code, said user identification code and the items data to said central processor in a short time burst; and*

*a processor center comprising:*

*(K) means for verifying said data terminal identification code, said user identification code and the items data as being received from respective ones of said terminals;*

*(L) means for transmitting an evaluation response to said terminal with respect to said order and identification code data sent by the terminal;*

(M) means for terminating said telephone link; and (N) means for forwarding the items data to a supplier to enable fulfillment of the order request.

16. The system of claim 15 wherein each data terminal further comprises an input/output port for data communication with peripheral equipment.

17. The system of claim 16 wherein said peripheral equipment comprises means for reading visually printed codes and producing items data indicative thereof and storing the item data in said memory.

18. The system of claim 15 wherein the supplier to which the items data is forwarded is selected by the user.

19. The system of claim 15 wherein said data terminal further comprises means responsive to a transmission from the local processor center for erasing the personal identification code data from the memory of the data terminal.

20. The system of claim 15 wherein said processor center further comprises: means for storing user-specific data and means for adding such user-specific data to the items data.

21. The system of claim 15 wherein said evaluation response comprises an acknowledgement by the processor center of each of said at least one particular order.

* * * * *